June 5, 1951     G. SIMONIAN     2,555,767
FOLDING SHOPPING CART
Filed Dec. 11, 1948
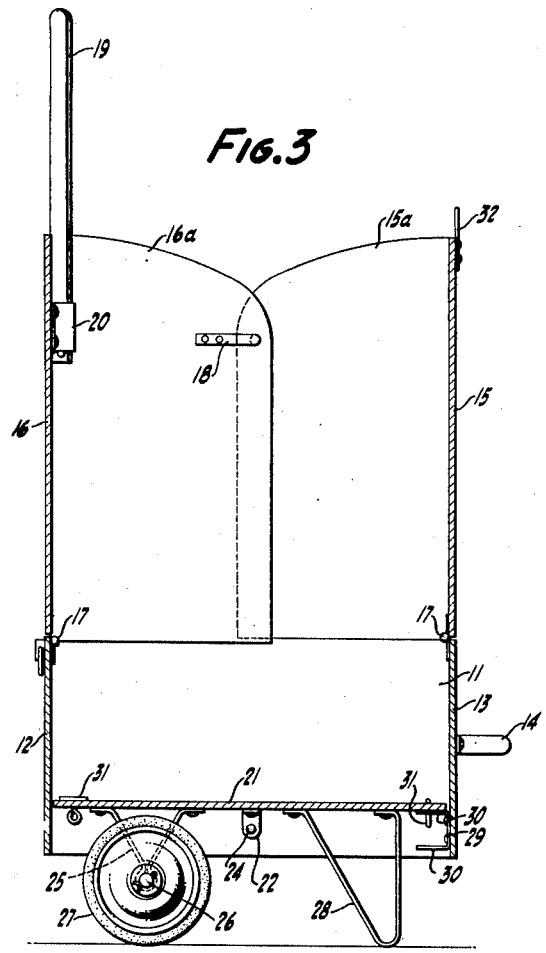
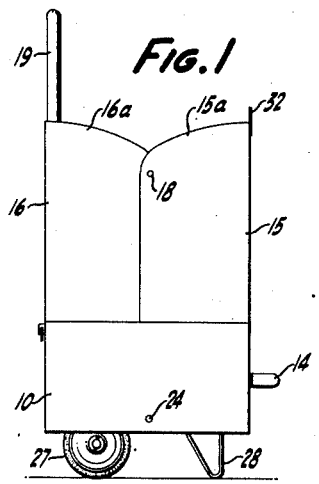
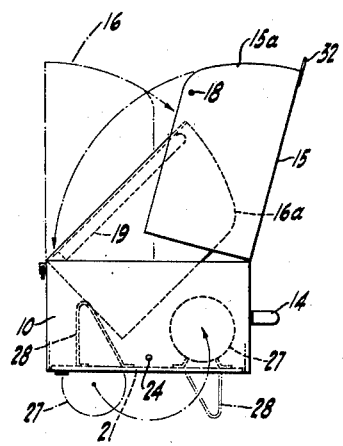
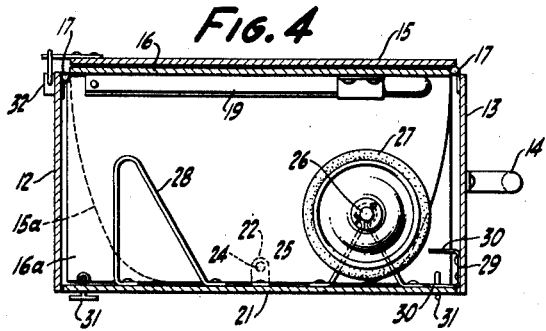
INVENTOR.
GERALD SIMONIAN
BY Naylor and Lassagne
ATTORNEYS Patented June 5, 1951

2,555,767

UNITED STATES PATENT OFFICE 2,555,767

FOLDING SHOPPING CART

Gerald Simonian, Fresno, Calif.

Application December 11, 1948, Serial No. 64,863

2 Claims. (Cl. 220—6)

This invention relates to shopping carts of the two-wheeled push type.

The main object of the invention is to provide a cart which can be collapsed into compact box-like form when idle and which will have large load receiving space when opened up or expanded for use.

Another object is to provide a shopping cart which will be sufficiently light and compact when collapsed to permit it to be conveniently carried by hand in the manner of a suit case.

Other objects and advantages will be apparent from the following detailed description of one specific embodiment of the invention as illustrated in the accompanying drawing forming part of this specification and in which:

Figure 1 is a view in side elevation showing the cart opened and in condition for use.

Figure 2 is a similar view showing the extension members of the cart disconnected from each other in preparation for folding.

Figure 3 is an enlarged view of the cart of Figure 1, with the box and panel portions of the cart being shown in cross-section, and Figure 4 is a view of similar nature as that of Figure 3, but plane showing the position of parts when the cart is folded.

Referring to the drawing, the cart comprises an oblong rectangular body or housing of box-like form having side walls 10 and 11 and end walls 12 and 13. A handle 14 may be provided on one of the walls for convenient carrying of the folded cart. Numerals 15 and 16 respectively designate extension members hinged at the lower ends as at 17, to the upper edges of the end walls 12, 13, each equal in length to the distance between said walls and each formed with side wings 15a and 16a extending at right angles from each longitudinal edge of the extension members and designed to meet and form overlapping edges at substantially the central transverse vertical plane of the cart housing or body. This brings the two extension members and side wings to the position shown in Figure 1. Complemental locking elements on the respective overlapping margins of the side wings, such as the snap fasteners at 18, serve to hold the extensions in upright position thus providing a deep load receiving space comprising the cart body plus the extensions. For wheeling the cart, the extension 16 is provided with a collapsible handle 19 which may consist of a U-shaped bail having its arm slidably mounted in sleeves 20 fixed on the inner surface of the extension wall.

The bottom of the cart body is closed by a construction including retractable supporting wheels such as disclosed and claimed in inventor's patent No. 2,439,992, April 20, 1948, and comprising a panel 21 supported on pivotable angle strips 22 journaled on rivets or pins 24 at the middle of the side members 10 and 11 of the cart body. At one side of its pivot to the cart body panel 21 has a pair of spaced brackets 25 supporting an axle 26 on the ends of which the rubber-tired wheels 27 are journaled. The forward part of panel 21 carries a fixed central U-shaped support 28 which, together with wheels 27, provides a three-point base for keeping the cart upright when not being wheeled. As will be evident, panel 21 can be reversed on the axis of pivots 24 to bring the wheels to and from operative position. To lock the panel in either position there is provided a bracket 29 secured to wall 13 having vertically spaced slotted arms 30. These arms cooperate with rotatable keys, or fasteners 31 at each end of panel 21 which are positioned to engage one or the other of the slots in the arms of bracket 29 in the respective positions of panel 21 and when so engaged turning the key 31 securely locks the panel.

The extensions 15 and 16 and wings 15a and 16a, which are preferably integral and formed of light material, such as sheet metal or fiberboard, are so proportioned as to fold down or collapse one over the other within the body of the cart. Therefore, it will be obvious that when the expanded cart shown in Figure 1 is to be closed and carried by handle 14, the panel 21 is first released and locked in reversed position to bring the wheels and support within the body walls, as seen in Figure 4, the panel 21 closing the bottom. The fasteners 18 are then disconnected and handle 19 moved down or telescoped in its slides whereupon extension 16 is folded down and extension 15 folded over it with the wings inside the body walls. A suitable latch 32 on extension 15 serves to lock it to wall 12 of the cart body closing its top. Reversing these steps expands the cart which can then be tilted and wheeled by use of handle 19.

It will be obvious that the specific embodiment of the invention above described may be modified as to details of construction without departure from the scope of what is claimed.

What is claimed is:

1. A cart of the class described comprising a rectangular box-like body upward extension members on opposite walls thereof equal in length to the distance between said walls and comprising a central panel and parallel side wings extending inwardly therefrom, the central panels being hinged at the lower edges to the upper edges of said walls and the longitudinal edges of the side wings on the respective panels being adapted to overlap when the extensions are in upright position thereby to form an upward extension of the body and releasable fastening means on the overlapped edges of the wings, said extensions being foldable into the body in superposed relation after release of the fasteners with the central panel of the uppermost extension forming a top closure for the body.

2. A cart of the class described comprising a rectangular box-like body, opposite extension members on opposite walls thereof comprising a central panel and parallel side wings extending inwardly therefrom, the central panels being hinged at the lower edges to the upper edges of said walls and the longitudinal edges of the side wings on the respective panels being adapted to meet when the extensions are in upright position thereby to form an upward extension of the body, and releasable fastening means on the meeting edges of the wings, said extensions being foldable into the body in superposed relation.

GERALD SIMONIAN.

REFERENCES CITED

The following references are of record in the file of this patent:

UNITED STATES PATENTS

| Number | Name | Date |
|---|---|---|
| 598,121 | Stevens | Feb. 1, 1898 |
| 1,322,419 | Francis | Nov. 18, 1919 |
| 2,314,194 | Buch | Mar. 16, 1943 |
| 2,486,067 | Schroeder | Oct. 25, 1949 |